May 28, 1935.  A. C. GILBERT ET AL  2,003,259

KITCHEN UTILITY DEVICE

Filed Jan. 4, 1933  3 Sheets-Sheet 1

Inventors
Alfred C. Gilbert
Arthur A. Arnold
Roderick Bartholow
By
Attorneys

May 28, 1935.  A. C. GILBERT ET AL  2,003,259
KITCHEN UTILITY DEVICE
Filed Jan. 4, 1933   3 Sheets-Sheet 2

Inventors
Alfred C. Gilbert
Arthur A. Arnold
By Rockwell Bartholow
Attorneys

May 28, 1935.  A. C. GILBERT ET AL  2,003,259
KITCHEN UTILITY DEVICE
Filed Jan. 4, 1933  3 Sheets-Sheet 3
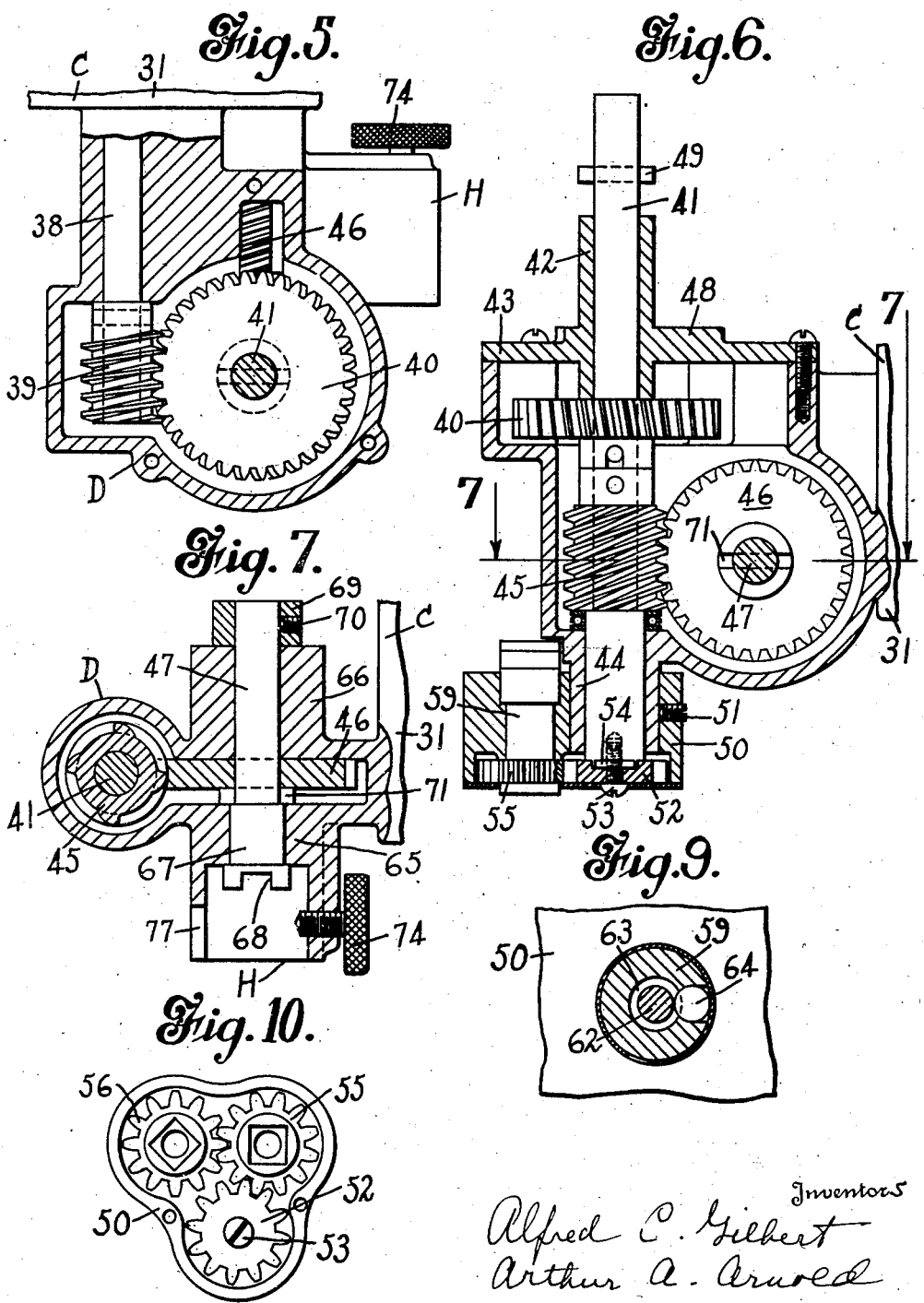
Inventors
Alfred C. Gilbert
Arthur A. Arnved
By Rockwell Bartholow
Attorney Patented May 28, 1935

2,003,259

UNITED STATES PATENT OFFICE 2,003,259

KITCHEN UTILITY DEVICE

Alfred C. Gilbert, North Haven, and Arthur A. Arnold, New Haven, Conn., assignors to The A. C. Gilbert Company, New Haven, Conn.

Application January 4, 1933, Serial No. 650,112

3 Claims. (Cl. 259—131)

This invention relates to kitchen utility devices of the type in which an electric motor drives suitable elements for mixing or beating materials and like operations.

One of the objects of our invention is to furnish a device of this character capable of performing a large variety of different operations and which is strong and rugged and yet inexpensive.

Another object is to furnish provisions of an improved character whereby one or more agitators depending into a suitable bowl or mixing receptacle and driven from above by an electric motor can be moved to an inoperative position so as to clear the bowl or receptacle and enable the latter to be withdrawn from its position on the base.

Another object is to provide an improved arrangement of parts whereby the electric motor is adapted to drive at slow speed various accessory appliances such as food choppers, coffee grinders, ice cube breakers, and the like.

Another object of the invention is to provide an improved and superior organization of parts in a kitchen mixing device of the type in which an electric motor drives one or more depending agitating elements, and also drives a power shaft having a so-called power socket associated therewith for the connection of a food chopper or like appliance.

Another object which we have in view is the provision of an arrangement of parts whereby the food chopper or like appliance can be supplied with the required power for the purposes in view.

To these and other ends the invention consists in the novel features and combinations of parts to be hereinafter described and claimed.

In the accompanying drawings:

Fig. 5 is an enlarged section on line 5—5 of Fig. 1;

Fig. 6 is an enlarged section on line 6—6 of Fig. 3;

Fig. 7 is a section on line 7—7 of Fig. 6;

Fig. 9 is a section on line 9—9 of Fig. 8;

Fig. 10 is a bottom plan view of certain parts shown in Fig. 6, with the cover of the lower gear case removed;

In its general features our device as particularly illustrated herein comprises a base adapted to support receptacles of different sizes and shapes; a pedestal rising from the base; an electric motor pivoted on the upper end portion of the pedestal to swing in a vertical plane; a gear case associated with the end of the electric motor overhanging the base; agitator shafts projecting downwardly from the gear case and driven from the motor; an extractor shaft projecting upwardly from the gear case and adapted to drive a reamer located in a juice-collecting and delivering bowl which may be supported on top of the gear case; and a power outlet socket associated with a power shaft in the gear case and located transversely with respect to the motor shaft and adapted for the connection of various accessory appliances to be driven at a relatively low speed, such as a food chopper, coffee grinder, ice cube breaker, or the like.

In the example selected for illustration, the base is indicated generally at A, the pedestal at B, the motor at C, the gear case at D, the depending agitators at E, the fruit reamer at F, the juice-collecting bowl at G, and the power socket for the connection of the accessory appliances, at H.

Figure 1:
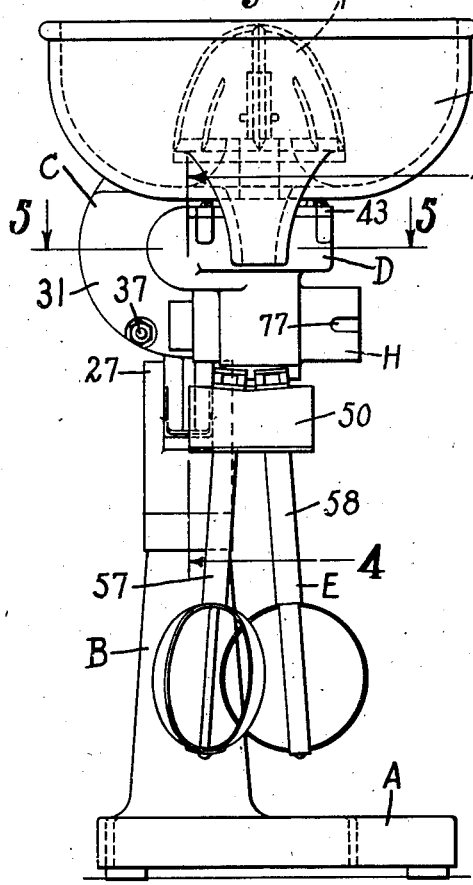
Fig. 1 is an end elevation of a kitchen utility device embodying our improvements, showing the juice extracting instrumentalities in position on the device.
Figure 3:
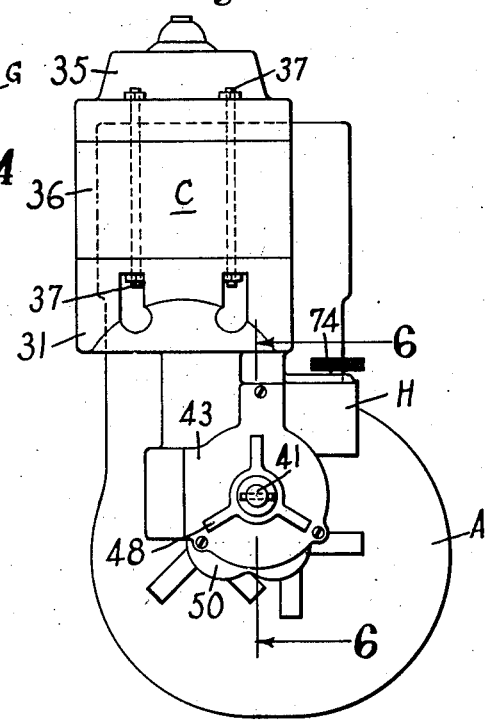
Fig. 3 is a top plan view of the same, with the fruit reamer and juice-collecting bowl omitted.
Figure 12:
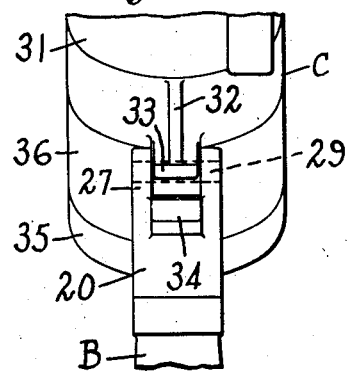
Fig. 12 is a detail front elevational view of the connection between the pedestal and the motor structure as it appears when the agitator elements are in the elevated position.
Figure 4:
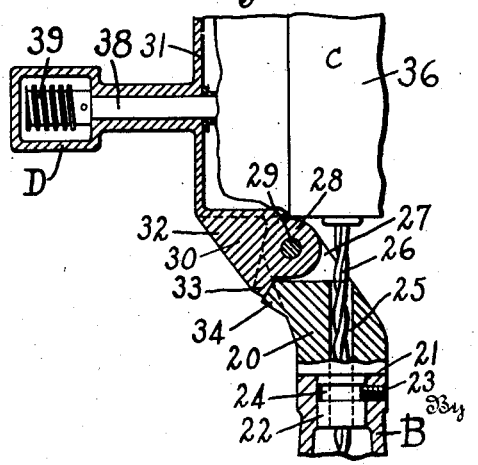
Fig. 4 is a section on line 4—4 of Fig. 1.

The base A can be made of any convenient form for supporting bowls and other receptacles in position beneath the agitators E. The pedestal B is preferably located at the rear end of the base, and at its upper end, which is somewhat offset from the longitudinal axis of the pedestal proper, the pedestal is preferably formed as a fork in order that the motor and the gear case associated with the motor may be conveniently pivoted to the pedestal. In the particular example shown the forked portion of the pedestal is free to turn relatively to the remainder of the pedestal, or, in other words, the forked portion has a swiveled mounting so that the motor and the parts carried thereby can be shifted laterally relatively to the base, but this is not necessary in all cases. In the example illustrated the forked portion or swiveled upper extension of the pedestal is shown at 20. This part 20 rests at 21 upon the upper edge portion of the pedestal proper. The pedestal proper is made of round cross-section and hollow and at its open upper end it receives a depending generally cylindrical projection 22 formed integral with forked member 20, and a set screw 23 passing through the side wall of the pedestal proper is adapted to engage an annular groove 24 in the projecting member 22. The screw 23 projecting into groove 24 maintains the member 20 in swiveled relation to the pedestal proper, and by proper adjustment of the screw 23 member 20 can be caused to turn with the desired amount of friction in its socket. By making the pedestal hollow and providing member 20 with a through bore 25 it is possible to lead an electric conductor 26 from the hollow base up to motor C in a convenient manner, and it will be observed from Fig. 4 that the conductor 26 can be disposed substantially in a straight line so as to avoid kinking or turning of the same in leading it from the interior of the pedestal proper to the motor.

Preferably the member 20 is provided with a fork at its upper end having branches or arms 27 between which is received a lug 28, and a pivot pin 29 passing through and connecting the arms 27 engages a bore in the lug 28 so that the lug is free to turn on the pivot pin. In this manner the motor structure is pivoted on the pedestal to swing in a vertical plane.

The lug 28 is preferably formed as an integral extension of a small bracket 30 cast integral with the front end shell 31 of motor C and depending from said end shell. The bracket 30 preferably comprises a web 32 and a flange 33 lying in a plane substantially intersecting the pivot pin 29. At its lower end the flange 33 is adapted to abut at its rear face the front face of a shoulder 34 projecting forwardly from member 20. When the flange 33 engages the shoulder 34, the motor structure is substantially horizontal, and the contact of the flange with the shoulder will prevent further downward movement of the agitators E.

Figure 2:
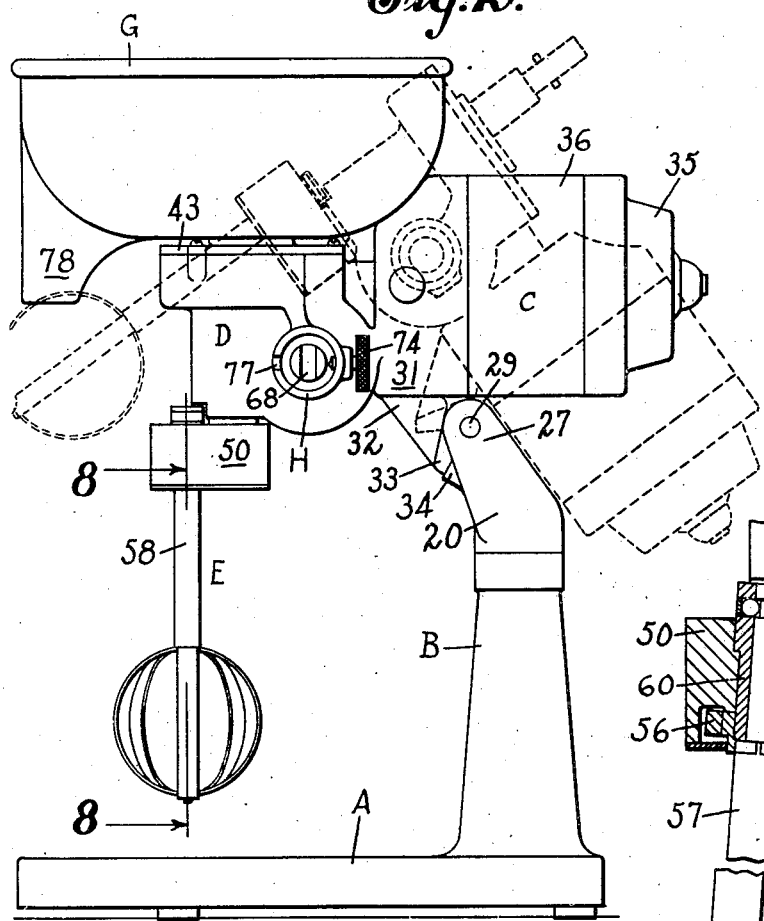
Fig. 2 is a side elevation of the device shown in Fig. 1.
Figure 8:
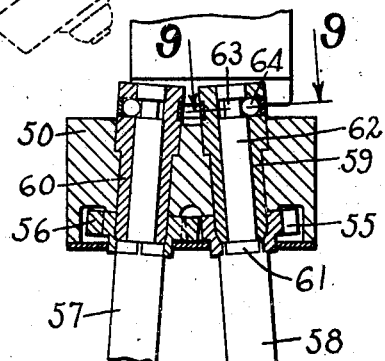
Fig. 8 is an enlarged section on line 8—8 of Fig. 3.

The arms 27 of the forked member 20 are preferably inclined upwardly and forwardly from the base portion of the fork-shaped member, and the pivot pin 29 when the parts are in the position shown in Fig. 2 lies in a vertical plane which is somewhat in front of the vertical axis of the pedestal proper. The arrangement shown enables us to provide for an ample tilting movement of the motor structure so as to bring the agitators E to a relatively high position, because when the agitators are lifted the motor C is free to move until its lower middle surface comes down into contact with the rearwardly disposed and inclined surfaces of the forked member, as shown by the dotted lines in Fig. 2. The construction above described enables us to mount the motor on the pedestal in a comparatively simple manner with the connection being made between the pedestal and the front motor shell, it being unnecessary to provide a special supporting means for the remainder of the motor structure. The rear end shell 35 of the motor structure and the intermediate shell 36 thereof and the parts contained within the motor casing are all sustained from the front end shell 31, which is the only part supported directly from the pedestal. Preferably the motor C is of the type in which a number of longitudinal bolts 37 are secured in and interconnect the opposite end shells of the casing.

When the tilting motor-actuated structure is tilted to the dotted line position shown in Fig. 2, a considerable amount of weight is shifted into a position rearwardly of the pivot, and the structure can be caused to maintain its upwardly tilted position after release by the operator and until such time as the tilting structure is manipulated to swing it back to the normal operating position.

The gear case D contains gearing shown more particularly in Figs. 5, 6 and 7. In the gear case is an extension 38 of the shaft of motor C, which extension is provided at its outer end with a worm 39. Worm 39 meshes with a spiral gear 40 on a vertical shaft 41. Shaft 41 has a bearing 42 in the removable cover plate 43 of gear case D, and it also has a bearing in a sleeve 44 projecting downwardly from and preferably integral with the gear case at the lower end of the latter. Below spiral gear 40 a worm 45 is pinned to shaft 41, and worm 45 meshes with a spiral gear 46 on a horizontal so-called power shaft 47, which extends to the so-called power socket H. This power shaft 47 serves for the operation of attachments using considerable power, such as food choppers, ice cube breakers, and the like. The juice-collecting bowl G may be conveniently positioned on top of the gear case D, and it has a bottom opening (not shown) fitting around the bearing sleeve 42. The bottom of the bowl is adapted to rest on ribs 48 projecting upward from the cover plate 43. A transverse pin 49 extending through the shaft 41 at the upper end portion thereof is adapted to engage the reamer F in the usual manner. After disengaging the reamer from the shaft the bowl G can be readily removed from the appliance by lifting it upwardly.

Engaging the downwardly projecting bearing sleeve 44 is a small housing 50 containing gears for driving the agitators E and constituting in effect a portion of gear case D. The housing 50 has a socket in which sleeve 44 is received, and a screw 51 detachably holds sleeve 44 in its socket. On the lower extremity of shaft 41 a small spur gear 52 is secured by a screw 53, shaft 41 having a squared portion 54 fitting a correspondingly shaped socket in the upper face of gear 52. Gear 52 meshes with a spur gear 55 in gear case 50, and gear 55 meshes with and drives a further spur gear 56. The gear 56 is positioned about and drives spindle 57 of one of the agitators, and gear 55 is disposed about and drives spindle 58 of the other agitator. At their lower portions the spindles 57 and 58 are equipped with beater blades or agitator elements of any desired form. Spur gear 55 is rigidly secured to a hub member 59 rotatable in case 50, and gear 56 is rigidly secured to a similar hub member 60. The upper ends of these hub members 59, 60 project upward slightly out of case 50. In its upper portion spindle 58 is provided with a squared portion 61 adapted to engage a correspondingly shaped socket in the lower part of gear 55 so that the spindle is nonrotatively engaged with the gear. Above portion 61 spindle 58 has a cylindrical portion 62 having near the upper extremity thereof an annular groove 63 adapted to be engaged by a spring-pressed anti-friction ball 64 for the purpose of yieldingly securing the spindle in driving engagement with its associated gear. It will be understood, however, that when it is desired to remove the spindle from the gear this may be done by exerting a relatively small amount of downward force on the spindle. The spindle 57 is mounted in substantially the same manner as spindle 58. Either spindle may be removed without interfering with the operation of the other as the gears 55, 56 are rotated whenever shaft 41 is rotated, the drive being from gear 52 to gear 55, and from gear 55 to gear 56.

Referring now to the power shaft 47, previously mentioned, it will be observed that this shaft is located nearer motor C than is shaft 41, and approximately at right angles to the motor shaft. Shaft 47 is relatively short and has end bearings 65 and 66 in the gear case. Shaft 47 has a somewhat enlarged cylindrical portion 67 on one end thereof provided on its end face with a groove 68 disposed in the projecting sleeve which constitutes the so-called power socket. On the opposite end of the power shaft the same carries a collar 69 secured thereto by means such as a screw 70, said collar being in contact with a portion of the gear case and acting to take up thrust on the power shaft. The gear 46, previously mentioned, is pinned to the shaft 47 by a pin 71.

Figure 11:
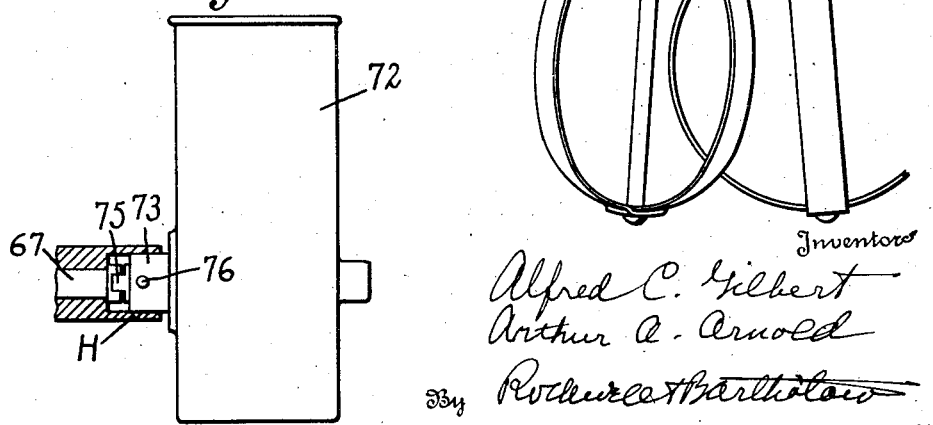
Fig. 11 is a detail view showing an ice cube breaker connected to the power socket of the device.

A device such as an ice cube breaker or the like may be attached to the power socket, and in Fig. 11 we have shown an ice cube breaker at 72. The projecting portion 73 of this ice cube breaker or other device enters the socket H and is held therein by a clamping screw 74. The ice cube breaker or other appliance has an operating shaft with a tenon 75 fitting into the groove or notch 68 in the end of the power shaft. This power shaft may be used for operating other appliances than an ice cube breaker, for example, a food chopper or a coffee grinder. The reduction gearing between shaft 47 and the motor shaft is such that the former shaft will rotate quite slowly and with ample power for performing the required functions.

The projecting portion or trunnion 73 of the ice cube breaker or other attachment has a pin 76 extending laterally therefrom to engage a notch 77 in the side of the power socket whereby the attachment is prevented from turning in the socket. The clamping screw 74 serves to prevent endwise displacement of the attachment relatively to the socket.

In mixing a beverage it is usual to remove one of the agitators and to employ a single agitator extending down into a glass resting on the base.

The juice-receiving bowl G has the usual discharge spout 78.

By swiveling the motor-operated superstructure on the pedestal, it is possible to swing the agitators laterally relatively to the base, and if desired, the agitators or one agitator can be caused to enter a receptacle located at one side of the base rather than on the base. The swiveling of the superstructure also, of course, provides for the operation of the juice extractor while the bowl that receives the juice is located at one side or the other of the base, and this increases the scope of the device and adds to the convenience of its use. The screw 23 or its equivalent, which is adjusted to engage the fork-carrying member 20 with the desired amount of friction, serves as a means for preventing dislocation of the motor and agitators when they have been swung to the desired adjusted position in a horizontal plane.

Various changes can be made in the details of the structure without departing from the scope of our invention as defined in the claims. We have not attempted to describe the various modifications which may be made without departing from the principles of our invention.

What we claim is:

1. In a kitchen utility device, the combination of a base, a pedestal rising therefrom, a bracket pivoted to the upper end of the pedestal to swing in a vertical plane, a motor fixed on the bracket and movable therewith, a gear case adjacent one end of the motor casing, a vertical shaft journaled in said gear case, worm gearing for driving said vertical shaft from the motor shaft, a power shaft located below the motor shaft and below the gearing connecting the vertical shaft with the motor shaft, said power shaft being disposed substantially at right angles to the motor shaft and located between the vertical shaft and the motor, a socket on the gear case associated with said power shaft for the connection of various accessory appliances, worm gearing connecting the power shaft with the vertical shaft so that it is driven therefrom, a fruit reamer connected with the upper end of the vertical shaft, and a depending agitator driven from the lower end of said vertical shaft.

2. In a kitchen utility device, the combination of a base, a pedestal rising therefrom, a bracket pivoted on the upper end of the pedestal to swing in a vertical plane, a motor carried by the bracket and movable therewith, a gear case adjacent one end of the motor, a vertical shaft journaled in said gear case, worm gearing for driving said vertical shaft from the motor shaft including a worm on the motor shaft and a worm gear on said vertical shaft meshing with said worm, a power shaft located below the motor shaft and below the gearing connecting the vertical shaft with the motor shaft, said power shaft being disposed at right angles to said motor shaft and located between the vertical shaft and the motor, worm gearing connecting said power shaft with said vertical shaft so that it is driven therefrom and comprising a worm on said vertical shaft and a worm gear on said power shaft meshing with said worm, a fruit reamer driven by the upper end of said vertical shaft, and a depending agitator driven by the lower end of said vertical shaft.

3. In a kitchen utility device, the combination of an electric motor having a horizontal shaft, a bracket supporting said motor, a pedestal to which said bracket is pivoted to tilt up and down, said motor being tilted with said bracket, a base from which said pedestal rises, a gear housing carried by one end of the motor in overhanging relation to the base, a vertical shaft journaled in said gear housing and driven from the motor shaft, the upper end of said shaft projecting upwardly beyond said gear housing, a reamer on the upper end of said vertical shaft, a pair of gears in said gear housing driven from the motor shaft, agitators removably connected to and depending from said gears and having overlapping paths of rotation and adapted to stir the contents of a receptacle supported on said base, a horizontal power shaft having bearings in said gear housing, a power socket associated with the gear housing for the connection of various accessory appliances to said power shaft, and reduction gearing for driving said power shaft from said vertical shaft, said agitators and said power shaft being tiltable with said motor, said power shaft being transverse to and below the motor shaft and between said motor and said pair of gears driving said agitators, and said power socket being located at the side of the gear housing between the agitator shafts and the pedestal.

ALFRED C. GILBERT.
ARTHUR A. ARNOLD.